WIDE-BAND HIGH-FREQUENCY INTERFERENCE SUPPRESSION FILTER

Filed Nov. 21, 1968

INVENTOR
EUGENE SIMMEN
BY
KARL RATH
ATTORNEY

United States Patent Office 3,537,042

Patented Oct. 27, 1970

3,537,042

WIDE-BAND HIGH-FREQUENCY INTERFERENCE SUPPRESSION FILTER

Eugène Simmen, Nussbaumen, Switzerland, assignor to Patelhold Patentverwertungs- & Elektro-Holding A.G., Glarus, Switzerland Filed Nov. 21, 1968, Ser. No. 777,630
Claims priority, application Switzerland, Nov. 23, 1967, 16,473/67
Int. Cl. H01h 7/10
U.S. Cl. 333—73 7 Claims

ABSTRACT OF THE DISCLOSURE

In a wide-band high-frequency interference suppression filter, the inner conductor of a coaxial transmission line, having an earthed outer conductor, is formed into a spiral turn, to provide a series inductor filter element surrounded by an earthed metallic screen and followed by a shunt capacitor filter element in the form of two cylindrical electrodes coaxial with an earthed cylindrical housing and connected to the inner conductor at points thereof spaced at a predetermined distance.

Figure 1:
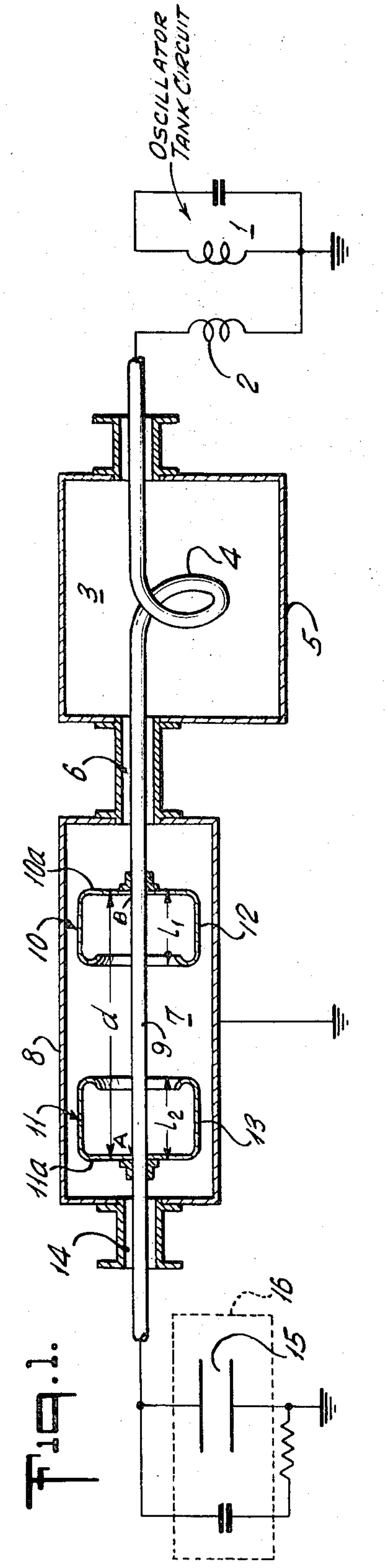

The present invention relates to an interference suppression filter, suitable especially for use in the VHF and UHF high-frequency ranges.

While the invention will be described in the following in reference to an interference suppression filter designed especially for use in connection with industrial high frequency heating installations, it will become evident that the filter structure proposed by the invention is susceptible of general application and use, wherever a relatively wide band of interfering frequencies is to be suppressed.

High-frequency heating apparatus for industrial purposes often has to be provided with interference suppression in accordance with strict state rules and regulations. Such regulations demand that there must be no interference with radio, television and official radio services, such as air transport, fire brigades, police, taxi-calling services, etc. In particular, installations for heating or processing dielectric material in the high-frequency electrical field of a capacitor cause a great deal of interference in view of the generally large dimensions of such installations. It is not always possible to accommodate the processing space within a perfectly sealed screening cage, especially where the material is treated in a continuous process while passing through said space between the electrodes of the treating capacitor, such for example as in the case of dielectric drying by means of high-frequency energy.

There are practically two possible ways of keeping external radiation within the permitted limits, to wit, the use of any desired operating frequency in connection with means to suppress both the fundamental and undesired harmonics by the provision of metallic conduits or channels of definite length and disposed at the inlet and outlet openings of the processing cage or space, on the one hand, or the use of a permitted operating frequency officially allocated for the special purpose, for example 13.560 mc. (mecacyles) ±0.05%, and suppression of the interfering harmonics at the source or output of the generator by a special interference suppression filter, interposed therebetween and the capacitative load, on the other hand.

Each of the foregoing solutions has both advantages and disadvantages. In arrangements according to the first type of interference suppression by means of inlet and outlet channels, there is in principle freedom in the choice of the operating frequency which, principally, does not have to be stable. Coupling to the load or treating capacitor may be carried out in simple fashion, such as by directly connecting the treating capacitor, including or being traversed by the material to be processed, in the oscillatory or tank circuit of the generator supplying the high-frequency operating energy.

This, however, involves difficulties in that the inlet and outlet channels of the treating space are effective in suppressing interference only up to a definite frequency, usually not higher than 80–100 mc. Moreover, the fact that the capacitative load device is directly connected in the tank or anode circuit of a vacuum tube oscillator makes the level of undesirable harmonics rather high, especially in the meter-wave range, making it in turn necessary to take measures for the suppressions of definite pronounced disturbing harmonics. For this purpose, it is well known to provide acceptor or series-tuned bypass or shunt circuits resonating at the respective frequencies. A disadvantage of such suppression circuits is their narrow band width, making it necessary to stabilize the operating frequency. A further disadvantage of such an arrangement is that the processing space must none the less be well screened, requiring thereby high quality and high cost mechanical constructions of installations of this type.

The channels at the inlet and outlet openings of the screening cage or housing of the capacitative load may each be about two meters long in the direction of movement of the material being processed, where the latter is continuously fed to the treating capacitor. This in turn requires considerable space for the mounting of the capacitor or load device.

On the other hand, in interference suppression arrangements of the above-mentioned second type, involving the use of interference filters between the output of the oscillator and load capacitor, it is preferred that the internationally allocated frequency of 13.560 mc. ±0.05% shall be used, this frequency being kept constant by special oscillator stabilizing means. With the second harmonic of this frequency, that is, 27.12 mc. and the third harmonic or 40.68 mc. being also officially permitted, interference suppression does not have to be carried out until the fourth harmonic of 54.24 mc. is reached.

According to this type of interference suppression, the material is heated as a capacitative load in a capacitor which is separate from the oscillatory or tank circuit of the high-frequency generator which is connected to said capacitor by way of a high-frequency transmission line in the form of a coaxial cable to which the oscillatory circuit of the generator is coupled via a coupling coil or winding.

In the case of such an installation, the problem arises of constructing a simple filter of which the suppression band extends over the frequency range of 40 mc. to about 800 mc. without any undesired additional or side-effects appearing at the operating frequency (13.650 mc.). Experiments have shown that multistage band suppression filters of the generally known type, consisting of multiturn coils and capacitors, can lead to difficulties and defects of various kinds, both practical and technical.

Accordingly, an important object of the present invention is substantially to overcome the prior and related difficulties by the provision of high-frequency heating or equivalent industrial high-frequency apparatus, including a high-frequency oscillator operating at a fundamental frequency of 1–20 mc. and connected to the capacitative or equivalent load device by way of a coaxial feeder, with a harmonic suppression filter being interposed between said oscillator and said device and comprising a series filter element consisting essentially of a screened inductor formed by at least one spiral turn of the inner conductor of said feeder, and a shunt filter element consisting of an earthed cylindrical metal housing traversed by the central conductor of said feeder disposed along the axis of said housing and connecting said oscillator to said load, said conductor having mechanically mounted thereon and electrically connected thereto at least two electrodes having cylindrical surfaces concentric with said housing and connected to said conductor at points thereof separated by a predetermined spacing distance.

By a construction of this type, more clearly described in the following, there is provided by the invention a fiter exhibiting a practically continuous attenuation or suppression range from the fourth harmonic to the fiftieth harmonic of the fundamental frequency of 13.560 mc.

Figure 2:
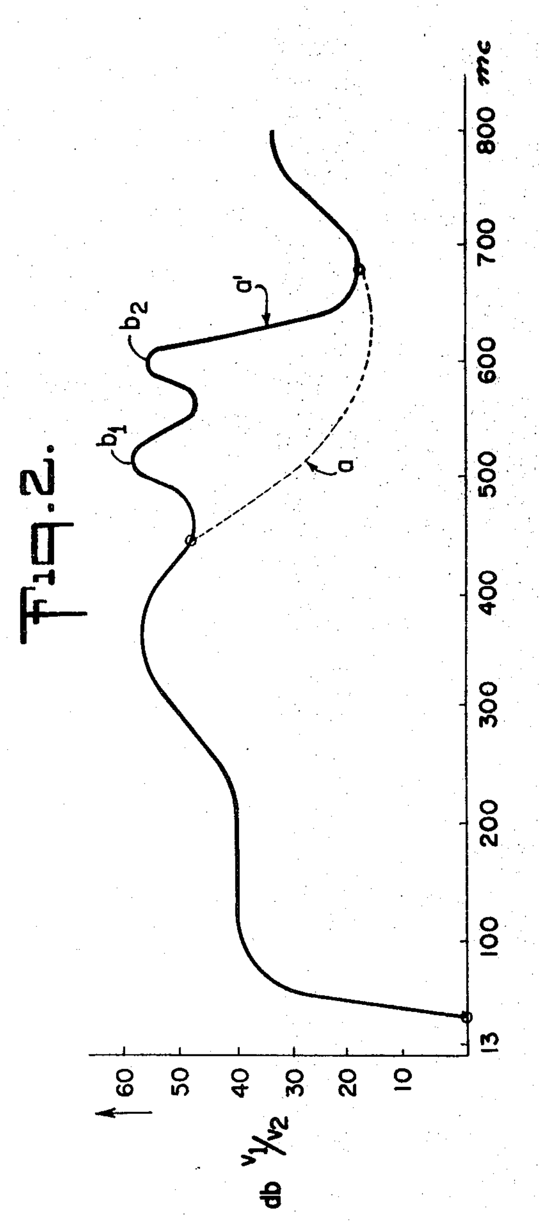

The invention, both as to the foregoing and ancilliary objects as well as novel aspects thereof will be better understood from the following detailed description, taken in conjunction with the accompanying drawing forming part of this specification and in which;

FIG. 1 diagrammatically shows a high-frequency dielectric heating system embodying an interference suppression filter, shown in longitudinal section and constructed in accordance with the principles of the invention; and FIG. 2 is a graph illustrating a frequency suppression characteristic obtained by filter according to FIG. 1.

Referring more particularly to FIG. 1, the oscillatory or tank circuit 1 of a high-frequency generator is coupled, by means of a coupling coil 2, to the series element 3 of the filter in the form of an inductor 4, which advantageously consists of a single turn winding of the inner conductor of a coaxial feeder, connecting the generator with the load, and which is surrounded by an earthed screen 5 coextensive with the outer conductor of said feeder. The shunt element 7 of the filter, being connected to the series element by way of a short section 6 of the coaxial feeder, is in turn contained within a closed earthed cylindrical metal housing 8 also coextensive with the outer conductor of the coaxial feeder. The inner conductor 9 of the feeder which carries the load current is arranged in coaxial and insulated fashion within the housing or cylinder 8. Two cup-shaped cylindrical electrodes 10 and 11 being arranged on the conductor 9 are concentric with the metal cylinder 8 and have their respective planer end surfaces 10*a* and 11*a* mechanically and electrically connected to said conductor at points A and B thereof separated by a predetermined spacing distance *d*. As a consequence, there are formed between the metal housing 8 and the cylindrical surfaces of the electrodes 10 and 11 cavities 12 and 13 of annular cross section and different axial lengths $\mathbf{l}_1$ and $\mathbf{l}_2$, whereby to provide a pair of shunt capacities between the electrodes 10 and 11 and the cylinder or housing 8. Attached to the latter there is a further short concentric line section 14 leading to the capacitative load device or dielectric heating capacitor 15 in which is placed or through which is continuously passed the material to be heated in accordance with well-known practice. As is well known, such a load device may be considered electrically as a capacitor shunted by a high loss resistance.

In the following will be described the function of the wide-band suppression filter connected between the generator and dielectric load of FIG. 1, assuming an operating frequency of 13.560 mc.

Within the lower partial cutoff or suppression range of the filter, that is, between approximately 40 mc. and 120 mc., in the case of the example mentioned the capacitance values of the capacitors 10 and 11 are effectively added on account of the voltages at the points A and B being substantially the same over lower frequency range. As a consequence, the inductance 4 in the feeding line together with the two cylindrical electrodes 10 and 11, constituting a single composite shunt capacity, act as a simple low-pass filter for frequencies within the range mentioned.

In the range above 120 mc. up to about 400 mc., the two electrodes 10 and 11, together with the interposed length *d* of conductor 9 act as a band-suppression or $\pi$-filter element. Moreover, each of the electrodes 10 and 11 may be designed to act as a quarter wave shunt at a definite frequency above 400 mc., in an effort to extend the total suppression band width of the filter, to cover both the VHF and UHF or television range of the frequency spectrum, in the manner as will become further apparent from the description of FIG. 2.

Referring to the latter, there is shown the general characteristic curve of a filter according to FIG. 1, representing attenuation ($V_1/V_2$) in db as a function frequency in mc. More particularly, the values plotted apply to a filter construction having the following approximate practical dimensions:

| | Mm. |
|---|---|
| Diameter of the inner conductor **9** | 30 |
| Length of housing **8** | 680 |
| Diameter of housing **8** | 266 |
| Diameter of electrodes **10** and **11** | 240 |
| Distance *d* | 470 |
| Length of electrode **10** | 120 |
| Length of electrode **11** | 150 |

As can be seen from FIG. 2, the filter provides high attenuation from the fourth harmonic of the fundamental of about 13 mc. up to a limit of about 400 mc. above which the attenuation normally decreases, as indicated by the dotted section *a* of the curve. In order to extend the frequency suppression range to a total upper limit of from 700 mc. to 800 mc., that is, covering both the VHF and UHF frequency ranges, the electrode lengths $\mathbf{l}_1$ and $\mathbf{l}_2$ are so adjusted in accordance with the values mentioned, to provide an extended section *a'* of the curve exhibiting peaking values $b_1$ and $b_2$ at discrete frequencies.

Expressed differently, points A and B are at substantially equal potentials within the lower partial frequency range from 40 mc. to about 120 mc. due to the quasi-stationary operating conditions or voltage distribution along the conductor 9 for frequencies within this range. As a consequence, both shunt capacities act as a single composite capacitor forming a low-pass filter together with the series inductor 4, in the manner pointed out. For higher frequencies, points A and B are at different potentials as a result of the nonstationary voltage distribution on conductor 9, thus providing the equivalent of a series impedance between points A and B and change to a band-suppression or $\pi$-filter arrangement.

The lengths $\mathbf{l}_1$ and $\mathbf{l}_2$ depend essentially on the values of the discrete frequencies to be shunted or bypassed and may be determined in accordance with local conditions. In a practical case, assuming the above dimensions, they may be chosen to provide short-circuits at about 500 mc. and 620 mc., respectively.

The distance *d* between the connecting points A and B of the electrodes 10 and 11 effects the filter characteristic and may also be varied according to local conditions, to secure optimum attenuation within the range concerned.

The use of a filter structure as described makes it unnecessary to construct the capacitative load device with any particular care as regards high-frequency interference suppression. Any harmful frequencies of interferring strength in the generator output do not reach the load capacitor and accordingly do not have to be rendered harmless by additional attenuating means connected across the load. Besides, if any alterations to the capacitative load device become necessary, they have practically no effect on the degree of interference elimination already attained in the installation.

In the foregoing, the invention has been described in reference to a specific operative device. It will be evident that variations and modifications, as well as the substitution of equivalent parts and elements for those shown herein for illustration, may be made within the broader spirit and purview of the invention.

I claim:

1. A wide-band high-frequency interference suppression filter comprising in combination:

(1) a coaxial line having an inner conductor and an outer conductor.

(2) a series inductor constituted by at least one spiral turn of said inner conductor and a metallic screen therefor coextensive with said outer conductor, and (3) shunt capacitor means comprised of (a) a concentric metallic cylinder coextensive with said outer conductor and surrounding said inner conductor, and (b) at least two cylindrical electrodes within said cylinder being mechanically mounted upon and electrically connected to said inner conductor at points thereof separated by a predetermined spacing distance.

(c) the outer cylindrical surfaces of said electrodes being concentric with and spaced from said cylinder.

2. In a filter as claimed in claim 1, said electrodes being of cup shape with the bottom surfaces thereof traversed by and connected to said inner conductor.

3. In a filter as claimed in claim 1, said spacing distance being such as to cause the electrical capacities formed by by said electrodes and said cylinder to additively combine into a composite shunt capacity for frequencies within a predetermined lower partial range of the total frequency band to be suppressed by said filter, and to cause said electrodes to act as separate shunt capacities for frequencies within the upper partial range of said band.

4. In a filter as claimed in claim 1, said spacing distance being such as to cause the electrical capacities formed by said electrodes and said cylinder to additively combine into a composite shunt capacity for frequencies within a predetermined lower partial range of the total frequency band to be suppressed by said filter, and to cause said electrodes and cylinder to act as separate shunt capacities for frequencies within the upper partial range of said band, said electrodes having different axial lengths, to act as quarter wave shunts for discrete frequencies above said band.

5. In a filter as claimed in claim 4, said frequency band comprising a range from about 40 mc. to 400 mc. and said electrodes designed to provide quarter wave shunts for frequencies of about 500 mc. and 620 mc., respectively.

6. In an interference suppression filter as claimed in claim 4 designed for connection between a high frequency generator and a high-frequency heating apparatus operated at about 13 mc., wherein said frequency band comprises a range from about 40 mc. to 400 mc. and said discrete frequencies are about 500 mc. and 620 mc., respectively.

7. In a high-frequency system including a high-frequency generator, a load, and a coaxial feeder having an inner conductor and an outer conductor and connecting said generator with said load, a harmonic suppression filter comprising:

(1) a series filter element consisting of (a) at least one spiral turn of said inner conductor to form an inductor, on the side adjacent to said generator, and (b) a first extension of said outer conductor, to form a screen for said inductor, and (2) a shunt filter element consisting of (a) a pair of cylindrical electrodes mechanically and electrically connected to said inner conductor on the side of said load and at points separated by a predetermined distance, and (b) a second coaxial extension of said outer conductor, to form a screen concentric with and spaced from the cylindrical surfaces of said electrodes.

No references cited.

HERMAN KARL SAALBACH, Primary Examiner

S. CHATMON, Jr., Assistant Examiner

U.S. Cl. X.R.

333—76, 79